United States Patent Office 3,391,080
Patented July 2, 1968

3,391,080
METALLIC FILM DIFFUSION FOR BOUNDARY LUBRICATION
Donald H. Buckley, North Olmsted, and Robert L. Johnson, Fairview Park, Ohio, assignors to the United States of America as represented by the Administrator of the National Aeronautics and Space Administration
No Drawing. Original application Oct. 15, 1963, Ser. No. 316,477, now Patent No. 3,317,341, dated May 2, 1967. Divided and this application Nov. 15, 1966, Ser. No. 594,633
7 Claims. (Cl. 252—26)

ABSTRACT OF THE DISCLOSURE

Gallium diffused into a surface forms a metallic film lubricant. Tin, lead, and indium are added to the gallium to reduce corrosion properties and lower liquid phase temperatures.

---

The invention described herein was made by employees of the United States Government and may be manufactured and used by or for the Government for governmental purposes without the payment of any royalties thereon or therefor.

The invention relates generally to metallic film lubricants. More particularly, the invention is concerned with a metallic film which is diffused into a metal or other material for use as a lubricant.

This application is a division of copending application Ser. No. 316,477 which was filed Oct. 15, 1963 and issued as U.S. Patent No. 3,317,341.

In aerospace applications where high reliability is desirable, it becomes necessary for moving parts to operate over substantial temperature ranges in the vacuum of outer space. Difficulty is experienced with available oil and grease lubricants because of their high evaporation rates. Some inorganic solid and soft materials having very low evaporation rates in vacuum appear to have promise as solid film lubricants for space. Where such lubricants are used as a liquid or in dispersed powder form, problems of zero gravity prohibit adequate lubrication as the lubricant will not maintain itself within the environment of the surface to be lubricated. Consequently, a lubrication system is used whereby a solid film lubricant is formed on a surface to be lubricated which would act as a boundary lubricant. However, where metallic film lubricants are required, difficulty is experienced in applying them to material surfaces used in aerospace environments. The main difficulty is that these metallic films will not maintain themselves on the surface to be lubricated after application. Further, the conditions of outer space dictate high operating temperatures due to solar radiation and heat generation experienced from rocket engine combustion. Therefore, it is also necessary to have lubricant films which will be resistant to temperatures to 1000° F.

Accordingly, an object of the invention is to provide metallic films to be applied to metal, ceramic and cermet surfaces which can be used as boundary lubricants in an aerospace environment.

Another object of this invention is to provide articles with surfaces of a metallic film diffused therein as distinguished from a mere coating of a metallic film.

Still another object of the invention is to provide metallic film lubricants having low friction properties which can withstand temperatures to 1000° F. and have a low evaporation rate.

Briefly, these and other objects of the invention are attained by preparing the surface to be lubricated, rubbing thereon liquified metals such as gallium and gallium in combination with tin, indium and lead, heating the surface with the metal thereon, allowing the surface to cool and wiping the excess metal therefrom. Subsequently, a post-heat treatment is given wherein the surface with the metallic film thereon is reheated and allowed to cool to room temperature thereby improving the friction and wear properties of the surface with the metallic film.

Other objects and advantages of the present invention will be described and will be apparent from the following description and the several embodiments thereof.

The surface upon which the lubricant film of the present invention is to be applied is cleaned. This is accomplished by rinsing the surface with acetone or another solvent to remove grease and oil. Subsequently, the surface is polished with moist levigated aluminum or other similar grinding compounds with a soft cloth. This polishing continues until the surface is perfectly clean.

After polishing the surface and thereby improving to a degree the surface finish, the surface is thoroughly rinsed with tap water followed by distilled water. The rinsing process can also be accomplished with alcohol or another similar type of fluid.

After cleaning the surface to which the lubricating film is to be applied, the metal which is to comprise the lubricant film is applied to the surface at a temperature above which it is in a liquid state. The liquified metal is applied to the surface by means of an applicator which, depending upon the surface and/or the temperature of the metal, can be a polishing cloth. The metal is rubbed over and diffused into the surface by applying a sufficient amount of pressure to the applicator. Where the temperature of the metal is beyond that which can be handled by a human hand, the applicator can be of a soft heat resistant material not reactive with the liquified metal nor abrasive to the surface upon which the liquid metal film is to be applied.

After the liquid metal is uniformly distributed over the surface, the sample is heated to a temperature of approximately 100° F. above its initial liquid phase temperature to allow the liquified metal to completely coat the surface and diffuse into the material surface. The sample is then allowed to cool to its lower liquid phase temperature and wiped dry with a nonabrasive cloth to remove any excess metal. It has been found that this method will form a solid metallic film boundary lubricant on a surface approximately 0.001 inch thick.

It has been further found that for most films, a post-heat treatment is preferable. The post-heat treatment consists of placing the surface with the metallic film thereon into an enclosed chamber for heating to a temperature of approximately 400° F. above its initial liquid phase temperature for a period of approximately one hour. In a method for accomplishing the aforesaid, a vacuum furnace can be used to eliminate oxidation problems. The surface with the lubricant film thereon is then removed from the furnace and is allowed to cool to room temperature. The post-heat treatment temperature and the length of time in the furnace can be varied; accordingly, this variance would affect the friction and wear properties of the surfaces associated with the film.

By use of the aforesaid method of the present invention, it is possible to impregnate materials with a metal which heretofore could not be done wherein the impregnated metals would form a film on the surfaces and act as a boundary lubricant.

For space applications, it is preferable that materials selected for a boundary lubricant have a low shear rate to give low friction coefficients, have as low a melting or liquid phase temperature as possible, and have a low evaporation rate. Further, the film should have as low an oxidation rate as possible. A metal which can be used with the method of the present invention is gallium. Tin, lead and indium can be added to the gallium in various amounts to provide for metallic film lubricants having reduced corrosion properties and, in some instances, a lower liquid phase temperature.

possible. For gallium at normal atmospheric conditions, the following can be achieved by the addition of tin or indium to the gallium.

TABLE 1

| Pressure | 440C Stainless Steel on 440C Stainless Steel | | Al$_2$O$_3$ on 440C Stainless Steel | |
|---|---|---|---|---|
| | Coefficient of Friction | Wear, In.$^3$/ Ft. of Sliding | Coefficient of Friction | Wear, In.$^3$/ Ft. of Sliding |
| Air, 29.9 mm. of mercury | .330 | 2.44×10$^{-9}$ | | |
| Vacuum, 10$^{-8}$ mm. of mercury | .170 | 2.01×10$^{-11}$ | .102 | 3.51×10$^{-12}$ |
| Vacuum, 10$^{-9}$ mm. of mercury | | | .038 | 5.20×10$^{-13}$ |

The following examples describe in greater detail the metallic film lubricants and the procedure for applying to a surface the aforesaid metals for use as a metallic film for boundary lubrication:

As a first example, gallium is used as the metallic film lubricant. Gallium is in liquid form over a temperature range of more than 3500° F. At atmospheric pressures, the liquid range is from approximately 86° F. to 3600° F. Gallium also has a low evaporation rate, that being $1 \times 10^{-10}$ grams/cm.$^2$/sec. While the gallium in actual application is applied to the surface of face seals which are made out of metals and ceramics, such as tool steels and alumina, or to bearing cages made out of graphite, lead and titanium, for the purposes of this example the gallium as well as the other metals were applied to a flat disc surface made out of 440C stainless steel which can be used in conjunction with a rider for friction and wear measurements.

As previously described, the disc specimen is prepared by rinsing with acetone to remove greases, oils and other contaminants contained thereon. Subsequently, the disc is polished with levigated alumina on a soft cloth and thoroughly rinsed with tap water followed by distilled water. Subsequently, liquid gallium is applied under pressure to the surface by means of a soft polishing cloth applicator in order to uniformly distribute the gallium over and into the surface of the disc. The aforesaid was accomplished at the lower liquid phase temperature of the gallium which is approximately 86° F. The disc with the gallium contained thereon and diffused therein is heated to a temperature of approximately 200° F. to allow the gallium to more completely coat and diffuse into the surface of the disc. The sample is subsequently wiped with a dry cloth to remove excess gallium immediately after heating. Subsequently, the sample is allowed to cool forming a film of approximately 0.001 inch thick on the surface of the disc.

The disc with the gallium film is given an additional treatment consisting of placing the disc specimen with the metallic film into a vacuum furnace and heating the disc to 500° F. for a period of approximately one hour. The disc is then removed from the furnace and allowed to cool to room temperature.

It has been found that for gallium where the time of the post-heat treatment was substantially less than one hour and at temperatures substantially lower than 500° F., the friction and wear for the disc-film combination was higher. Whereas, when the post-heat treatment temperature was 1000° F., the friction and wear properties were the same as for 500° F. Consequently, in the present embodiment of the invention, optimal friction and wear results were obtained with a post-heat temperature between 450° F. and 550° F. for an approximate period of one hour.

The following table is an example of friction and wear properties of the gallium as a metallic surface film according to the present invention using two material combinations under atmospheric conditions and in a vacuum.

In use of any type of metallic film applied to a surface as herein described, it is preferable that the metal used for the film have as low an initial liquid phase temperature as As a second example of the present invention, approximately 8 percent tin is added to gallium which lowers the initial liquid phase temperature of the pure gallium from approximately 86° F. to 68° F. This facilitates the application of the metallic film lubricant. Using 92 percent by weight gallium and 8 percent by weight tin, the eutectic alloy is applied as heretofore described for gallium in Example 1; however, the application temperature is at room temperature that being approximately 72° F.

The following additional eutectic alloys of tin-gallium are found to provide adequate boundary lubrication to temperatures beyond 1000° F. and have an initial liquid phase temperature below that of pure gallium.

| Percent Weight | |
|---|---|
| Gallium | Tin |
| 96 | 4 |
| 85 | 15 |
| 78 | 22 |
| 70 | 30 |
| 60 | 40 |

The tin-gallium eutectic alloys give approximately the same friction and wear properties as the pure gallium film in Table 1.

As a third example, approximately 24.5 percent by weight indium is added to the gallium which produces an initial liquid phase temperature of approximately 60° F. giving the additional advantage of applying this eutectic alloy at a lower temperature than that of pure gallium. The indium-gallium eutectic alloy is applied as in Example 2 for the tin-gallium eutectic alloy.

The following additional eutectic alloys of indium-gallium are found to provide adequate boundary lubrication to temperatures beyond 1000° F. and have an initial liquid phase temperature below that of pure gallium.

| Percent Weight | |
|---|---|
| Gallium | Indium |
| 87.5 | 12.5 |
| 50 | 50 |
| 29 | 71 |

The indium-gallium metallic surface films produce friction and wear results which do not vary significantly from that presented for the gallium metallic film lubricant summarized in Table 1.

In many instances, pure gallium will be corrosive to certain materials. Over a period of time, such corrosion will occur in apparently inert materials such as stainless steel. Tin, indium and lead added to the gallium in various amounts reduces the corrosivity of the gallium with various materials.

As a fourth example, lead is added to the gallium in various amounts from 5 percent to 50 percent. The addition of lead to gallium will not reduce its liquid phase temperature. The corrosivity of the alloy can, however, be reduced. Friction and wear tests for the gallium-lead alloy with amounts of lead by percent weight contained therein, up to 50 percent, indicated that the friction and wear properties of this alloy did not vary significantly from that of pure gallium alone.

In an embodiment of the present invention, a metallic lubricant film can be formed on the contacting surfaces of rotating machinery such as gears, elements of rolling-contact bearings and rotating face seals. A further embodiment of the present invention can be the formation of an intermediate metallic film between two heat transfer surfaces in contact whereby the contact of the surfaces is not on the asperities of the surfaces but rather, the contact is over the entire area as defined by the metallic film.

The present invention and specific embodiments thereto provide not only for metallic film boundary lubricants to and beyond 1000° F., but also lubricants having low friction coefficients and low evaporation rates in aerospace applications.

It is apparent from the above description that various modifications in the specific materials and procedures described may be made within the scope of the invention. Therefore, the invention is not intended to be limited to the particular materials and procedures described in detail herein except as may be required by the appended claims.

What is claimed is:

1. A metallic film boundary lubricant having an initial liquid phase temperature below 100° F. comprising a eutectic alloy of gallium and a corrosion reducing metal having a melting point under 1000° F. selected from the group consisting of lead, indium, and tin.

2. A metallic film boundary lubricant as claimed in claim 1 consisting of a eutectic alloy of gallium and lead.

3. A metallic film boundary lubricant as claimed in claim 2 comprising a binary alloy of gallium and between about 5 percent and about 50 percent by weight lead.

4. A metallic film boundary lubricant as claimed in claim 1 consisting of a eutectic alloy of gallium and indium.

5. A metallic film boundary lubricant as claimed in claim 4 comprising a binary alloy of gallium and indium between about 12.5 percent and about 71 percent by weight indium.

6. A metallic film boundary lubricant as claimed in claim 1 consisting of a eutectic alloy of gallium and tin.

7. A metallic film boundary lubricant as claimed in claim 6 comprising a binary alloy of gallium and between about 4 percent and about 40 percent by weight tin.

References Cited

UNITED STATES PATENTS

| | | | |
|---|---|---|---|
| 2,700,623 | 1/1955 | Hall | 117—71 |
| 2,980,475 | 4/1961 | Wolfe | 252—25 |
| 3,141,238 | 7/1964 | Harman | 29—498 |

DANIEL E. WYMAN, *Primary Examiner.*

I. VAUGHN, *Assistant Examiner.*